INVENTOR
MAX SCHWAERZER

Dec. 22, 1931.  M. SCHWAERZER  1,838,061
APPARATUS FOR FORMING SHEET METAL ARTICLES
Filed Jan. 31, 1928   12 Sheets-Sheet 6

INVENTOR
MAX SCHWAERZER
BY
ATTORNEYS

Dec. 22, 1931.  M. SCHWAERZER  1,838,061

APPARATUS FOR FORMING SHEET METAL ARTICLES

Filed Jan. 31, 1928   12 Sheets-Sheet 7

INVENTOR
MAX SCHWAERZER
BY
ATTORNEYS

Dec. 22, 1931.  M. SCHWAERZER  1,838,061
APPARATUS FOR FORMING SHEET METAL ARTICLES
Filed Jan. 31, 1928    12 Sheets-Sheet 8

INVENTOR
MAX SCHWAERZER

Dec. 22, 1931.  M. SCHWAERZER  1,838,061
APPARATUS FOR FORMING SHEET METAL ARTICLES
Filed Jan. 31, 1928   12 Sheets-Sheet 9

INVENTOR
MAX SCHWAERZER
BY
ATTORNEYS

Dec. 22, 1931.  M. SCHWAERZER  1,838,061
APPARATUS FOR FORMING SHEET METAL ARTICLES
Filed Jan. 31, 1928   12 Sheets-Sheet 10

INVENTOR
MAX SCHWAERZER
BY
ATTORNEYS

Patented Dec. 22, 1931

1,838,061

UNITED STATES PATENT OFFICE

MAX SCHWAERZER, OF NEW YORK, N. Y., ASSIGNOR, BY MESNE ASSIGNMENTS, TO MAX MIRKIN, EDGAR A. FITTER, AND RUSSELL G. MORRIS, ALL OF NEW YORK, N. Y.

APPARATUS FOR FORMING SHEET METAL ARTICLES

Application filed January 31, 1928. Serial No. 250,857.

This invention relates to improvements in apparatus for forming articles from sheet metal stock, and has particular reference to a combined die and punch for shaping articles, such as triangular corner shields for trunks, boxes, traveling bags and the like, and punching therein attachment holes.

Heretofore, articles of the character described have been manufactured by apparatus necessitating five different and distinct manipulations, namely, stamping a flat disk from a sheet metal blank, striking up the disk in a single blow of a die press into its finished triangular conformation, and thereafter separately punching therein three attachment holes for the reception of rivets or other fastening means to secure the article in place for use. It has also been proposed to partially draw a portion of a sheet metal blank into triangular shape centrally, then punch the attaching holes in the flat blank adjacent the drawn portion, and thereafter sever the flat perforated and drawn portion from the sheet, and finally draw and shape the partially formed article into its finished shape. In the former process, the five distinct production steps are expensive and laborious, and an inferior product results by reason of the excessive strains suffered by the metal, causing the apex to rupture and the side and edge to pucker or wrinkle. Articles produced according to the latter described process are similarly imperfect in that the likelihood of rupture or cracking of the metal is increased, especially along that portion of the shield subjected to successive drawing; the percentage of waste articles is excessively great; and the attaching holes are drawn to elliptical or elongated shape instead of round.

The primary object of the present invention is, therefore, the production of corner shields for trunks, boxes and the like in a more effective and finished manner than heretofore.

A further object is the production of articles of the above character which are superior in shape and durability to articles of like character previously produced.

A further object of my invention is the provision of a die mechanism for forming articles, such as corner shields, in which the drawing and forming strains are distributed evenly throughout, and which forms an article symmetrical and even of surface so that a perfect article of great durability results.

A further object is the provision of a combined die and punch for forming and punching in a single operation articles of the desired character, whereby time and labor costs in production are reduced to a minimum.

Other objects will be in part obvious and in part hereinafter pointed out in connection with the following analysis of the invention, when taken in connection with the accompanying drawings illustrating one of various possible embodiments of the invention.

The invention accordingly consists in mechanism hereinafter described and claimed, whereby a disk stamped from a sheet metal blank or strip is cupped or partially drawn into upwardly convex shape, and then fully drawn into the desired perfect shape and at the same time perforated to form the attachment holes, the said steps being performed in a single operation of a single press, so that after a preliminary stroke of the press plunger to form a single cupped disk as above noted, each stroke of the press produces a completely finished and perfectly formed article.

In the drawings—

Fig. 1 is a side elevation of a portion of a power press embodying my improvements; Fig. 2 is a perspective of the finished article superposed on the corner of a trunk, box or the like; Fig. 3 represents in sequence the steps involved in making shields or caps in accordance with my invention.

Figures 1, 2, 3:
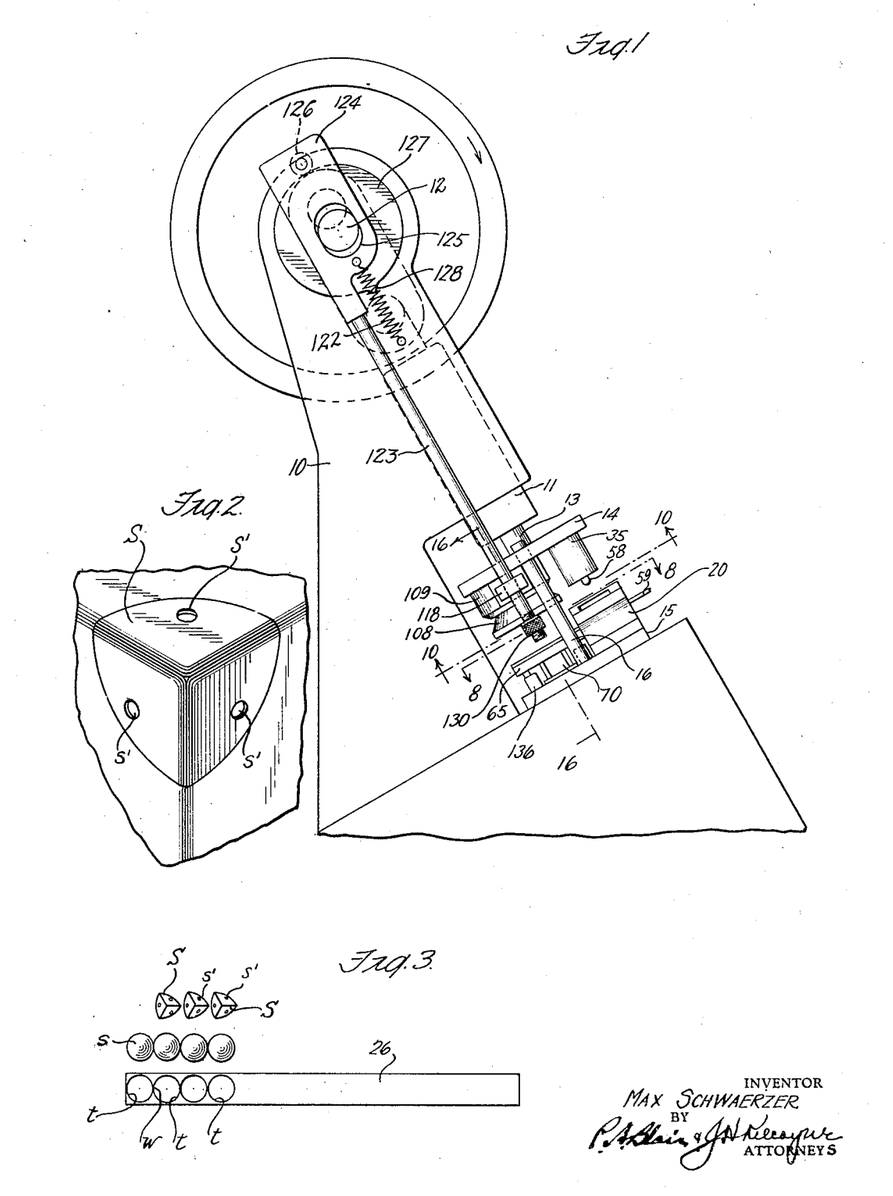

In the drawings, the combined forming die and punch has been illustrated as an attachment to a conventional power press of approved construction generally indicated at 10, Fig. 1, having a reciprocating plunger 11 actuated from the rotating shaft 12 driven from any suitable source of power. The plunger thru an intermediate stem 13 carries a head 14, to which are rigidly secured the female die members. The press is provided with the usual bed plate 15 on which the male die members are fixedly mounted. Fixed in the bed plate and extending upwardly therefrom are guide rods 16 which extend thru suitable apertures in the head 14. The head and mechanism carried thereby, when reciprocated, is guided on rods 16 in proper alignment with the parts carried on the bed plate.

In order that a clearer understanding may be had of the structure to be hereinafter described, it is explained that the article to be produced is a triangular shield or cap to protect the corners of trunks, boxes and the like, as indicated at S in Fig. 2. The shield is formed from a sheet metal strip in the following operations. A single disk is stamped from the strip, and in a preliminary forming die is drawn to assume a cupped or upwardly convex shape. Subsequently, the drawn disk is delivered to the final forming or finishing die in which the disk is drawn and formed into its final triangular shape. While maintained in this latter die, the punching mechanism for forming the attachment holes is rendered operative, and the three attachment holes are simultaneously punched in the shield. When the shield has been completely formed and the attachment holes punched therein, it is automatically lifted from the die and discharged into a hopper or the like.

Considering now the mechanism for stamping and initially forming or cupping a disk from a ribbon or strip of sheet metal stock, a block 20 is rigidly secured to the bed plate 15 as by bolts 21 or the like, the said block having a bore 22 therein undercut as at 23. An annular ring member 24 is mounted in a recess in the block about the bore 22 and has a circular opening therein of a diameter equal to the diameter of the bore. The upper and inner corner of the said member forms a cutting edge as hereinafter explained. Guide pieces 25 are secured to and extend along the sides of the upper face of block 20 to guide a strip or ribbon 26 of sheet metal stock across the bore opening. About the member 24 and between the guide pieces 25, I secure shims 27, 28 to the block which permit strip 26 to be readily fed thru the said guide pieces. A spring pressed roller 30 is mounted in one of the guides 25 whereby strips of varying widths may be accommodated and fed across the block. At the feed side of the block is mounted a wick supporting frame 31 in which the wick 32 is mounted to receive lubricant from a source of supply as indicated at 33. The wick supplies the strip with a lubricant such as water which moistens the upper and painted face of the strip whereby the paint does not chip or crack during the subsequent working of the strip.

Rigidly mounted on the reciprocating head 14 is a member 35 to which is threaded a depending ring 36. The member 35 and ring 36 are mounted in axial alignment with the bore 22 and are adapted to enter therein when the head 14 is reciprocated, and have a sliding snug fit therein. The lower outer edge 37 of the ring forms a complemental cutting edge with the cutting edge of the annular member 24 above noted. The inner edge 38 of the ring 36 is curved inwardly for a purpose later noted.

At each down stroke of the press plunger carrying with it the head 14 and the ring 36, a circular disk is stamped from the strip 26 by reason of the cutting edges of the ring 36 and member 24 engaging the strip as the ring 36 is projected thru the member 24 and into the bore 22.

Figure 5:
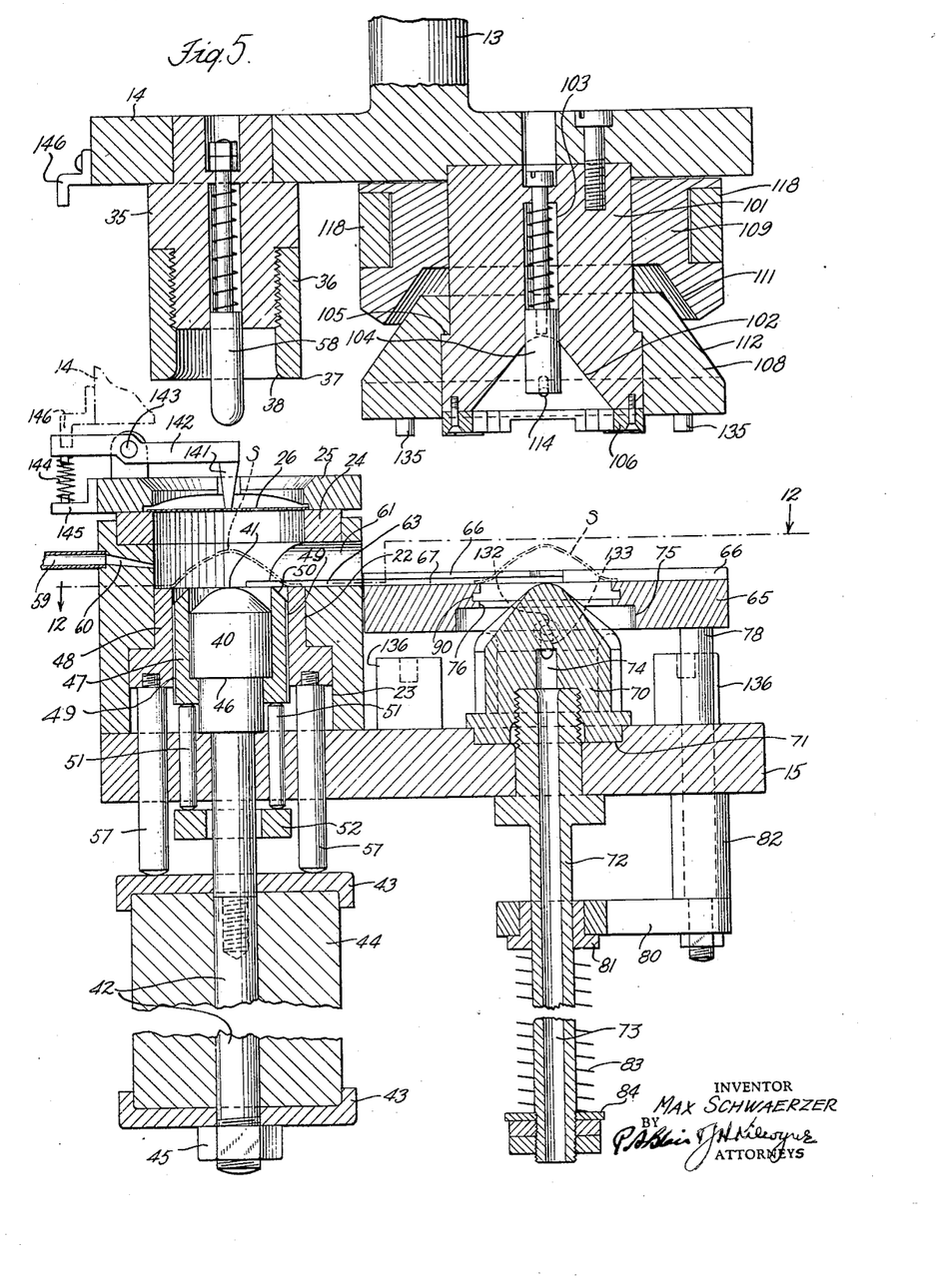
Fig. 5 is a vertical section along line 5—5 of Fig. 4.

Fixed in the bed plate 15 and disposed in the bore 22 is a male die member 40 having an upwardly convex forming surface 41 and a depending extension 42 passing downwardly thru the bed plate and thru top and bottom cover plates 43 which house a shock absorbing or cushioning member, such as a rubber block 44. The end of the extension 42 is screw-threaded and a nut 45 retains the bottom plate 43 in desired position thereon. The die member 40 is provided with a shoulder 46 and is encompassed by an annular shell 47 which has a sliding fit therewith and with a sliding collar 48 fitting in the bore 22. The said collar is provided with a flange which extends into the undercut portion 23 of the bore. The upper face 50 of the shell member is annularly convex to form a continuation of the forming surface 41 of the die member. The said shell member is limited in its axial movement by the shoulder 46 of the die member and the bed plate 15 and is normally urged into its uppermost position against the shoulder 46 by pins 51 extending thru the bed plate and engaging a cross bar 52. The bar 52 is mounted from fixed studs 53 secured to the under side of the bed plate and is slidable thereon. Springs 54 operative between the bar 52 and the heads of the studs 53 resiliently urge the cross bar in its uppermost position, which in turn normally maintains the shell 47 in its uppermost position indicated in Fig. 5. The sliding collar 48 is permitted a range of movement determined by the undercut bore portion 23 and is held in its uppermost position by studs 57 which extend thru the bed plate and engage the top plate 43 of the cushion member 44.

Figure 6:
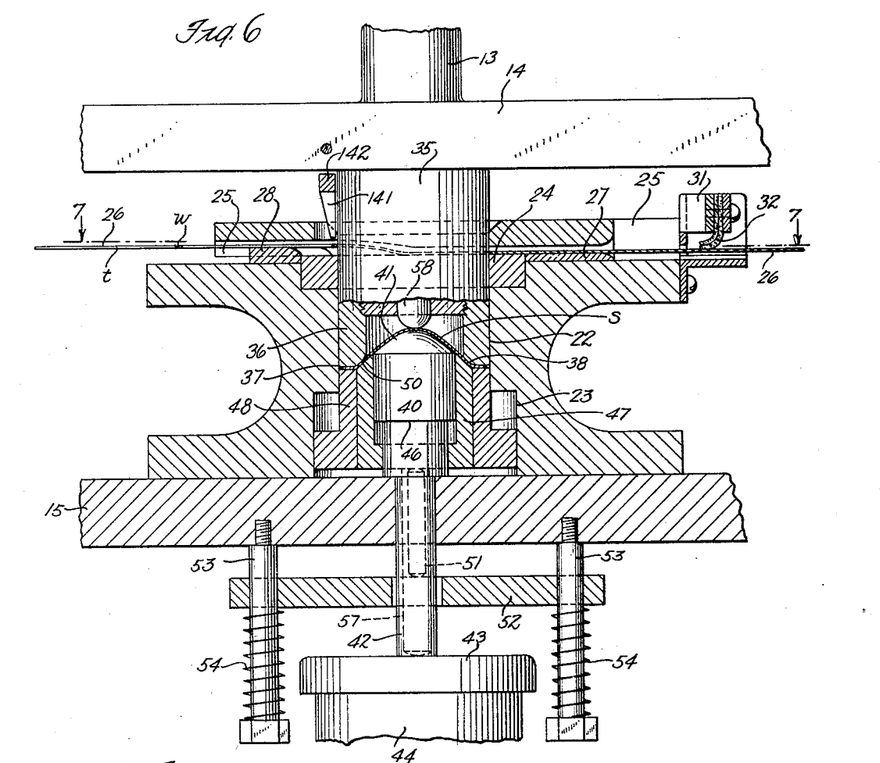
Fig. 6 is a view partly in section similar to Fig. 4 showing the preliminary forming or cupping relation of the die parts.
Figure 7:
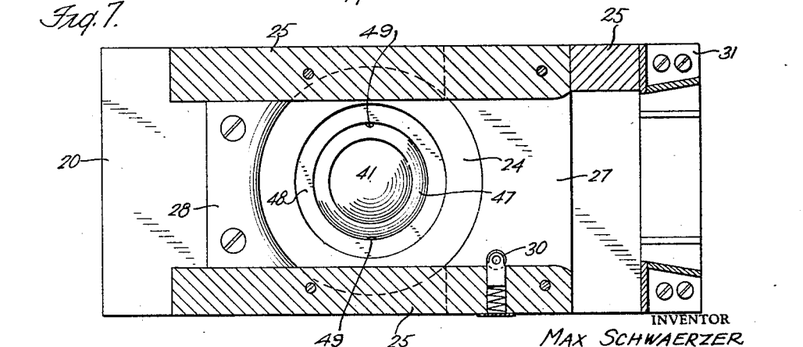
Fig. 7 is a section along line 7—7 of Fig. 6, with the press plunger raised as in Fig. 4.
Figure 8:
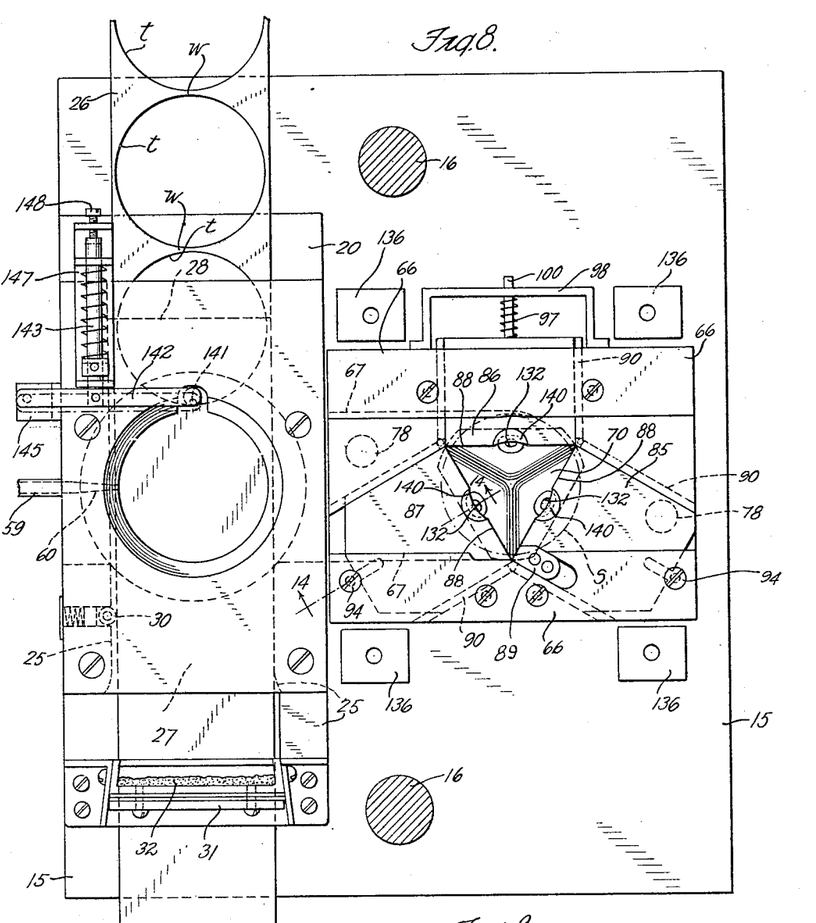
Fig. 8 is a section along line 8—8 of Fig. 1.
Figure 9:
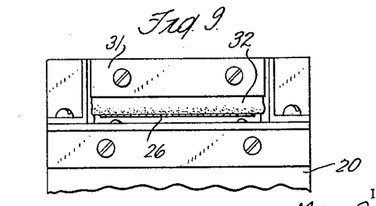
Fig. 9 is a detail of the blank lubricating elements.

After a circular disk has been stamped from the strip 26 as described above, the disk falls by gravity or is forced by the ring 36 on its down stroke to engage flat upon the top surfaces of the ring 48, shell 47 and die member 40. Thereafter the edge is engaged between the rings 36 and 48 and drawn downwardly, the central portion of the disk being drawn about the fixed forming surface 41 of the die member. In the position assumed by the die parts in Fig. 6, the ring 36 at the end of its down stroke has drawn the disk into a cupped or upwardly convex shape having a flat annular portion formed between the rings 36 and 48, and a curved portion formed by rounded corner 38 of the ring 36 engaging against the annular convex surface 50 of the shell 47 and as defined by the forming surface 41 of the die member. By reason of the resilient slidable mounting of the parts 47 and 48, there results a gradually increasing gripping action on the disk which serves to incipiently draw the disk into its upwardly convex shape and to thereby distribute the strains set up in the metal throughout substantially the entire area thereof.

A spring pressed plunger 58 mounted in member 35 extends downwardly thru ring 36 to engage the tip of the cupped disk and maintain it centered on the die member 40. On the up stroke of the press plunger, the ring 36 is raised and the disk is carried upwardly by the ring 48 as the latter and shell 47 tend to assume their normal position. The shell member 47 is provided with longitudinal grooves 49 to break any vacuum developed in the bore 22 and thus movement of the parts 47 and 48 is not delayed thereby. The cupped disk is thus raised to the dotted line position, Fig. 5. Compressed air from a suitable source is admitted to the bore 22 thru nozzle 59 and aperture 60 formed in the block 20 and urges the cupped disk thru a discharge opening 61 at the rear of the block. The admission of the compressed air may be automatically or manually intermittent, or may be continuous. By reference to Fig. 6, it will be seen that shim 28 is of a greater depth than shim 27 to provide a space permitting air circulation in the bore and to raise the strip 26 as will hereinafter be described.

Figures 13, 14, 15:
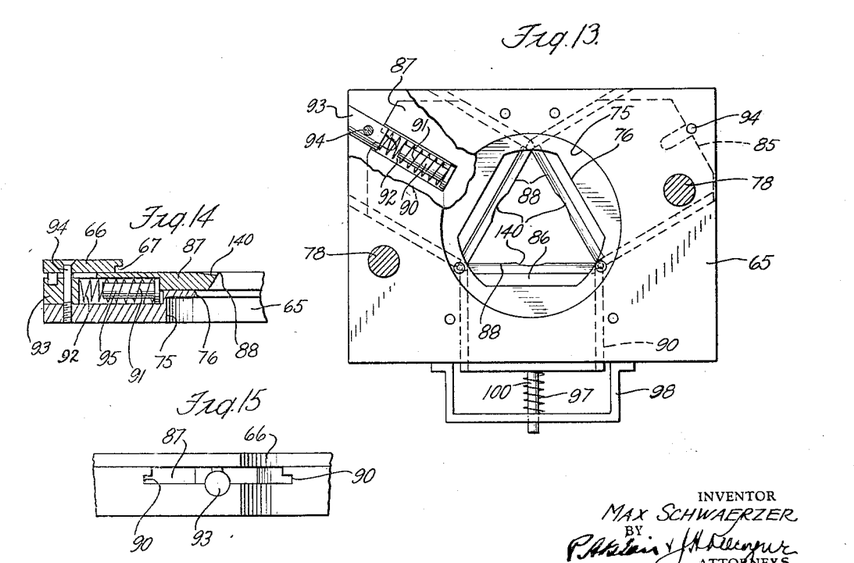
Figs. 13, 14 and 15 are details of the final drawing die (female member), Fig. 14 being a section along line 14—14 of Fig. 8.
Figures 16, 17:
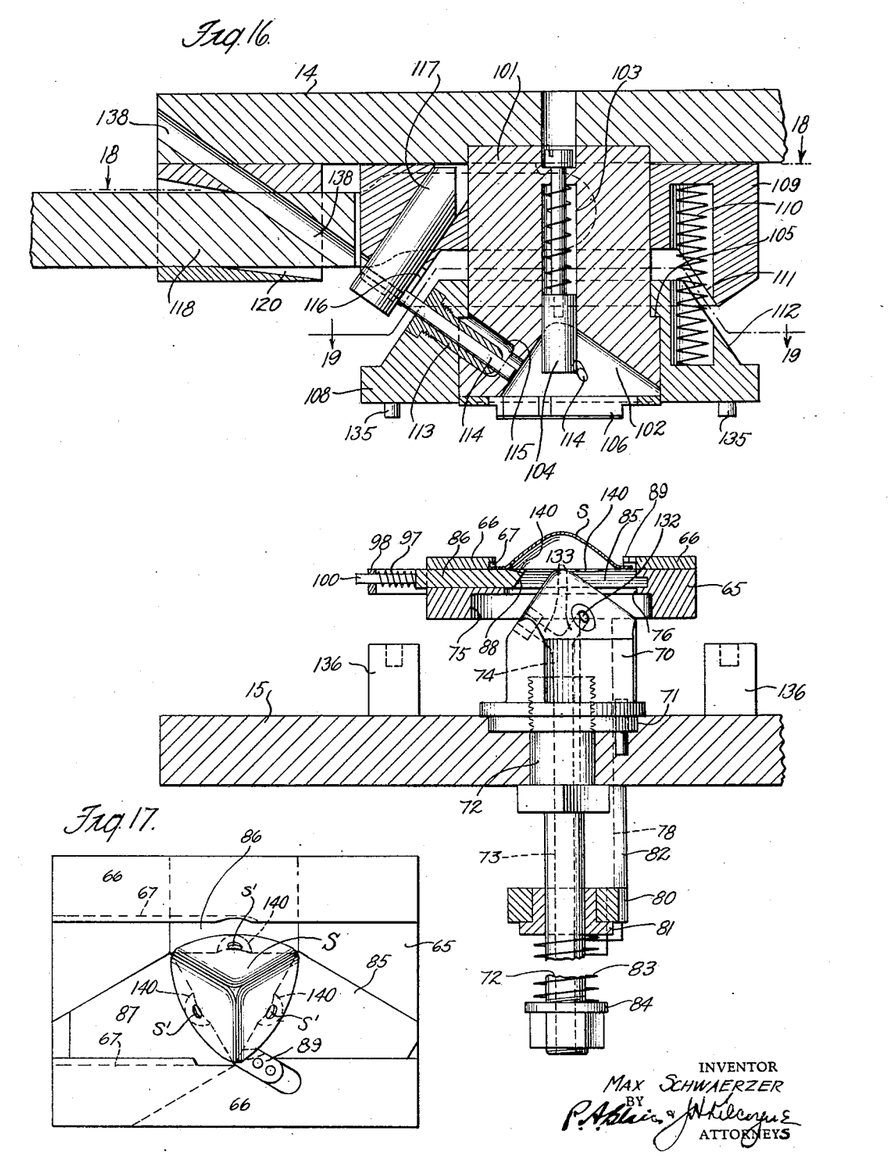
Fig. 16 is a section along line 16—16 of Fig. 1 showing the relation of the final forming operation.
Fig. 17 is a top plan view of the male die member and superposed table as shown in Fig. 16.
Figure 18:
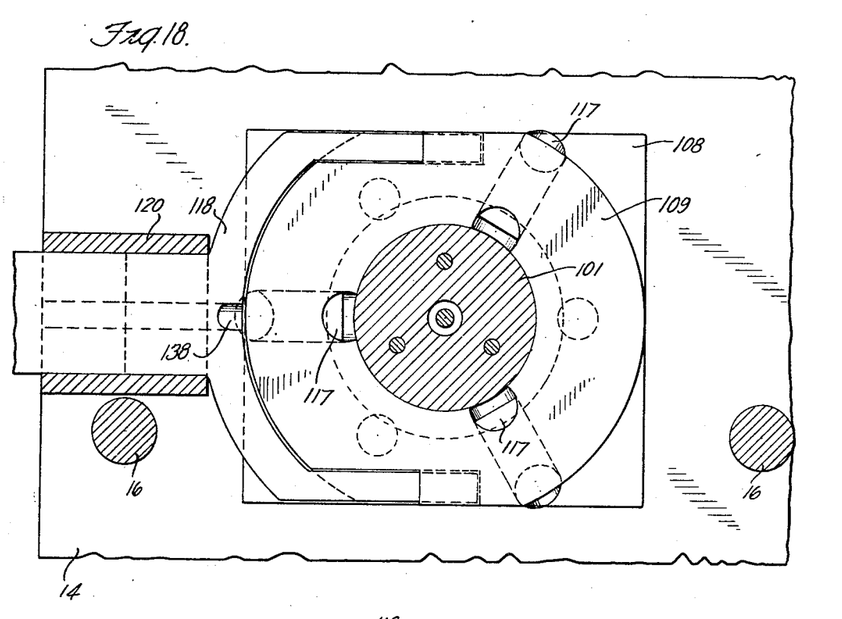
Fig. 18 is a section along line 18—18 of Fig. 6.
Figure 19:
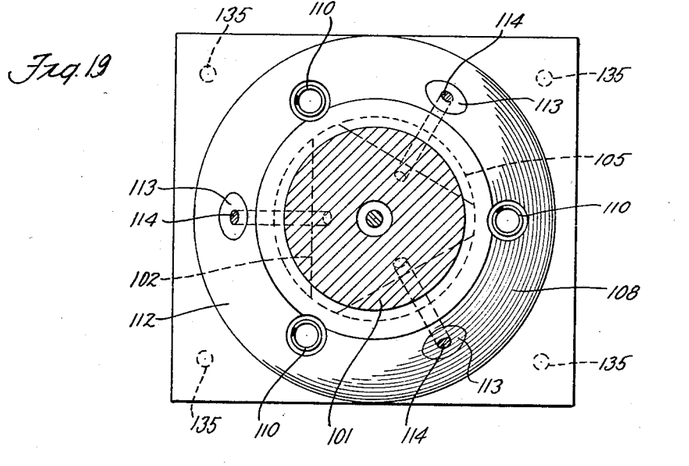
Fig. 19 is a section taken along line 19—19 of Fig. 16.

As illustrated in Fig. 1, the press is rearwardly inclined and the parts mounted on the bed plate 15 are similarly inclined. The cupped disk thus passes rearwardly thru opening 61 in which are provided guide ways 63 which guide the disk on to a table 65 mounted directly behind the preliminary forming mechanism just described. The said table is provided with gibs 66 secured thereto, as by screws, which are undercut as at 67 (Fig. 14) to a point substantially midway of their length to form a continuation of the ways 63 formed in block 20. The cupped disk slides on to table 65 throughout the length of the guide ways 67 at the termination of which it is in position for the final forming and punching operation.

The final forming or finishing die comprises a male die member 70 (Fig. 5) seated in a recess 71 of bed plate 15 and screw-threaded to a tubular member 72 having a longitudinal bore 73 extending therethru. The die member is provided with a central recess 74 communicating with the said bore 73 and has an exterior forming surface of triangular shape, the apex of which is disposed upwardly.

The table 65 is provided on its under face with a circular recess 75 (Fig. 13) which opens into the substantially triangular recess 76 extending from the upper face of the table. Supporting rods 78 fixed to the table extend through suitable apertures in the bed plate 15 and have secured to their lower extremities a cross bar 80. A bushing 81 positioned in the cross bar has a sliding fit on the tubular member 72. Bar 80 is spaced from the bed plate by a bushing 82 which determines the uppermost position of table 65, the latter being normally so maintained by a spring 83 operative between bar 80 and a fixed washer 84 at the extremity of the tubular member 72. Mounted on the table 65 are angularly related lifting plates or slides 85, 86, 87 having their edges 88 extending across and parallel to the plane faces of the triangular die member 70. Plate 85 has disposed therein an insert member 89 which aids in centering the cupped disk over die member 70. The said plates slide in undercut portions 90 of the table in a direction normal to a vertical plane across the said triangular faces and are normally maintained in their innermost position to contact with each other at their corner portions. Slides 85, 87 are so held by springs 91 (Fig. 14) mounted in a recess 92 formed between the said plates and the table 65, which are operative between the said plates, and a plug 93 fixed to the table 65 as by a set screw 94. The springs 91 encompass a plunger 95 which positions the said springs and directs the pressure thereof against the slides 85, 87. The slide 86 is maintained in its innermost position by means of a spring 97 operative between said slide and a bracket 98 extending from the table 65. The spring 97 encompasses a pin 100 which is fixed in the slide 86 and extends thru the bracket 98.

Positioned above the die member 70 is a female die block 101 fixed in the reciprocating head 14 and which is recessed at its under portion as at 102 in a triangular conformation reverse to the forming surface of the die member 70. The die block is further bored as at 103 to receive a spring pressed plunger 104 which serves to center and resiliently maintain the article being formed.

Figures 20, 21:
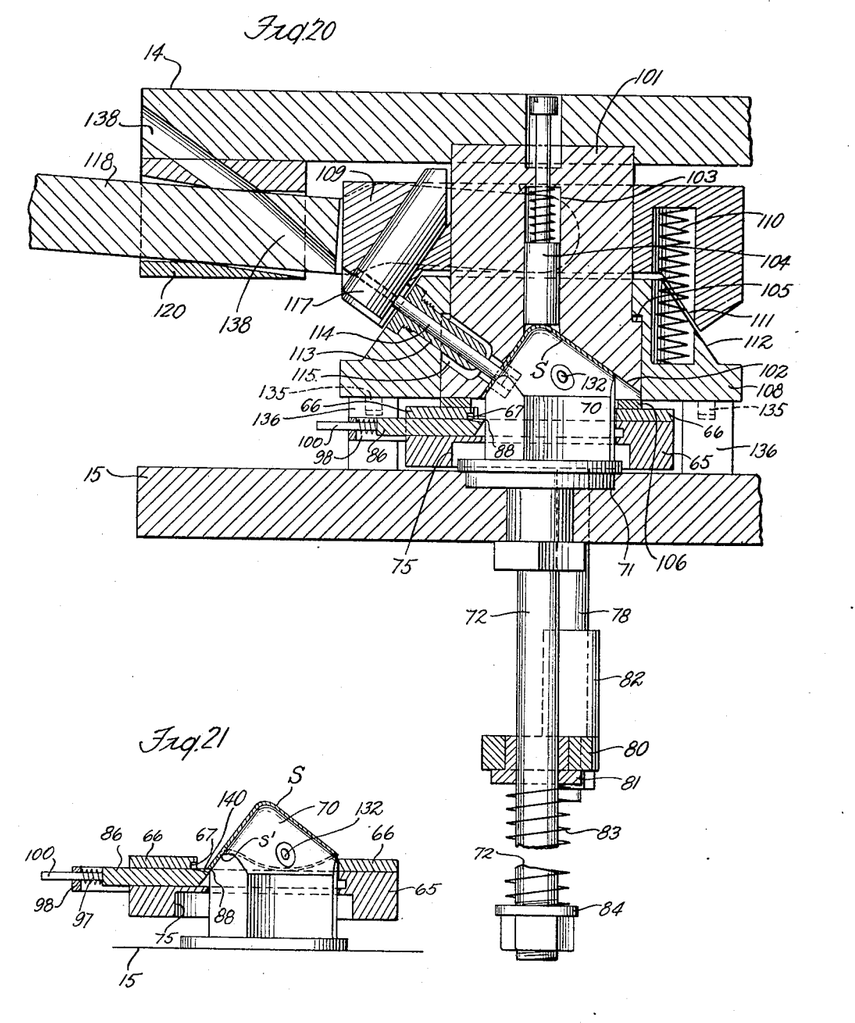
Fig. 20 is a section taken thru the final forming die, showing the punches operative to punch attachment holes in the formed corner shield.
Fig. 21 is a detail in section of the lifting plates about to raise the completed shield from the male die member.

On the under face of the die block, a part 106 is secured to surround the recess 102 and to engage the gibs 66 and table 65 as the head 14 is projected downwardly. The inner surfaces of part 106 serve to centralize the cupped disk before it enters the forming recess 102 of the female die member. The cupped disk is positioned on table 65 above the die member 70 as defined by the termination of the ways 67. The down stroke of the press plunger carries with it the head 14 and die member 101, and the latter engages table 65 and depresses the same over die member 70 as indicated in Fig. 20. Plates 85, 86, 87 expand and engage the non-forming or straight sides of the die member 70. The disk is thus formed into its finished triangular shape between the forming surfaces of the die members 70 and 101.

Considering now the attachment for punching the attachment holes into the finally formed article maintained in the closed die, a ring 108 having a slide fit on the die block 101 is provided and has an undercut bore which engages with shoulder 105 of the die block. The said shoulder thus limits the downward movement of the ring 108 relative to the die block. Arranged above the ring 108 and having a sliding fit on the die block 100 is a sliding collar 109. Springs 110 arranged in triangularly disposed recesses of ring 108 and collar 109 normally maintain these parts separated. A portion of the adjacent faces of the ring and collar are inclined in parallel relation, as indicated at 111 and 112. Mounted in inclined relation in ring 108 are punch holders 113 and punch cutters 114 therein, which extend into recesses 115 in die block 101, the said recess being elongated to permit relative movement between the block and ring 108. The punches 114 are positioned normal to the triangular faces of the forming recess 102 of the block 101 and extend beyond the inclined surface 112 into slots 116 cut in collar 109.

The said collar is provided with plugs 117 fixed in suitable recesses therein and which are inclined normally to the punches 114 and rigidly carry the same. The punches are held in the plugs 117 by a force fit. A forked arm 118 is joined to collar 109 and is fulcrumed in a block 120 fixed to the head 14. Adjacent the outer end of the arm 118, an opening 121 is provided. Rod 123 extends thru the said opening and has at its upper extremity an enlarged portion 124 suitably slotted at 125 to receive the drive shaft 12, the said portion 124 carrying a roller 126.

A cam plate 127 which is engaged by roller 126 rotates with the drive shaft 12 and has thereon a cam extension 128. Rotation of the drive shaft 12 brings cam 118 into engagement with roller 126 and causes the member 124 and rod 123 to be momentarily raised against the urge of spring 122. At the extremity of the rod 123 is a nut 130 which engages bar 118 when the rod is raised, causing the bar to fulcrum about its mounting in block 120. The yoke or forked portion of said bar is thus depressed and projects collar 109 downwardly, and the plugs 117 are thereby caused to move (Fig. 20) inwardly so that their punches 114 move in a direction normal to the plane faces of the forming surfaces of the die blocks 70 and 101. The male die member 70 is suitably recessed at 132 to permit the punches to extend a short distance therein to thus punch a clean hole in the article maintained between the die members. Passage ways 133 in die member 70 extend from said recesses 132 to the bores 74 and 73, (Fig. 5) to thus permit the waste material punched from the article to be expressed therethru from the die member.

The cam extension 128 is so arranged circumferentially on cam plate 127 as to become operative upon the termination of the down stroke of the press plunger, that is, immediately after the die members 70 and 101 have completely formed the cupped disk into its final triangular shape, but before the press plunger has begun its up or return stroke. The punching operation thus takes place while the formed disk is supported within the die members, thus eliminating strain or bending of the formed article. In Fig. 20, the die parts 70 and 101 are shown in closed relation and the punches have perforated the article to form the attachment holes as above described. In this relation of parts, the ring 108 has been carried downwardly with the die member 101 until lugs 135 thereon have seated in suitable recesses in spacing blocks 136, which slightly raise the ring 108 from the shoulder 105 on die block 101 against springs 110, thus permitting unobstructed engagement between the die parts 70 and 101. This movement is accommodated for with respect to the die block 101 and punch holders and punches 113 and 114 respectively extending therein, by the elongated recesses 115 in the said die block. The elongated recesses 115 further serve the function of permitting lost motion between the parts 101 and 108 to prevent damage to the die members 70 and 101 should more than one cupped disk become piled up on the die member 7.

Figures 10, 11:
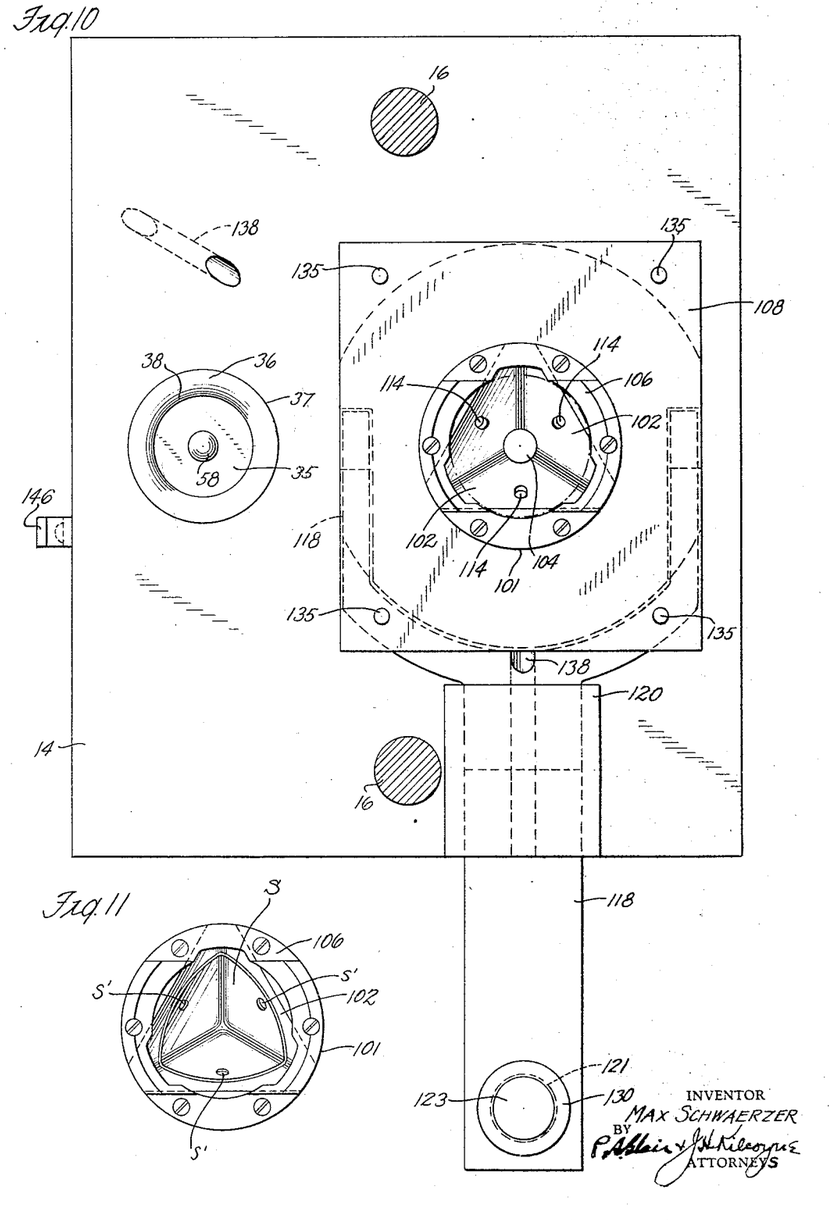
Fig. 10 is a section looking along line 10—10 of Fig. 1.
Fig. 11 is a detail of the under face of the final drawing mechanism with a shield therein.
Figure 12:
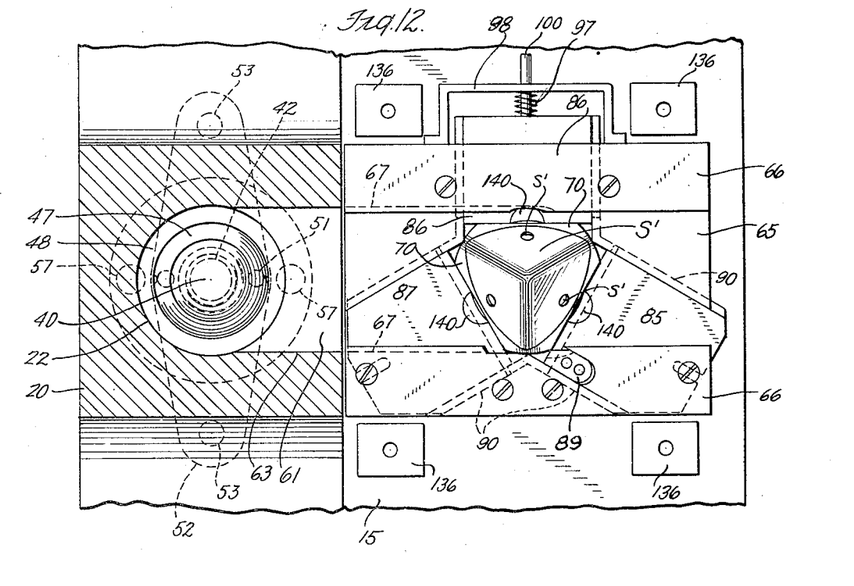
Fig. 12 is a section along line 12—12 in Fig. 5.

To permit access to each of the punches 114, the two openings 138 extending thru head 14 and adjacent parts are provided (see Fig. 10), it being unnecessary to provide an opening or hole for the third punch which is readily accessible. By this arrangement, the punches 114 may be knocked loose from their plugs 117 by the insertion of a driver in holes 138, and the punches removed for sharpening or renewal purposes. This arrangement is advantageous in practice and can be carried out without dismantling the die members.

Upon the up stroke of the press plunger, the die block 101 is raised and the finished and perforated triangular shield rests upon male die member 70. The table 65 is now free to move upwardly and is urged in so doing by spring 83. The spring pressed slides 85, 86, 87, which have undercut recesses 140 in their operative edges 88 to prevent the edges 88 from being dulled by engagement with the straight sides of die member 70, engage beneath the formed shield as the table moves upwardly to lift the shield from the die member 70 and raise the same on the table 65. Due to the inclination of this table and to the blast of air from the nozzle 59, the shield falls rearwardly into a bin or hopper.

In the above construction, if a strip of sheet metal be fed across block 20, a completely formed and punched shield S results after the second intermittent feed step, and thereafter a complete shield is formed and punched at each down stroke of the press plunger. Referring to Fig. 3, the strip or ribbon 26 of sheet metal material, which may be of any approved length, is represented as being fed to the dies. The first stroke of the press plunger stamps a circular disk s from the strip, and partially upsets the same into an upwardly convex shape, leaving a circular hole t in the strip 26. On the second stroke of the plunger and upon further feed of the strip, the upset disk is finally formed into its desired shape, such as the shield S, and the attachment holes s' punched therein, while another disk s is being stamped from strip 26 and partially upset. Subsequent intermittent feed of the strip and operation of the press results in producing a complete article S at each stroke of the press.

Figure 4:
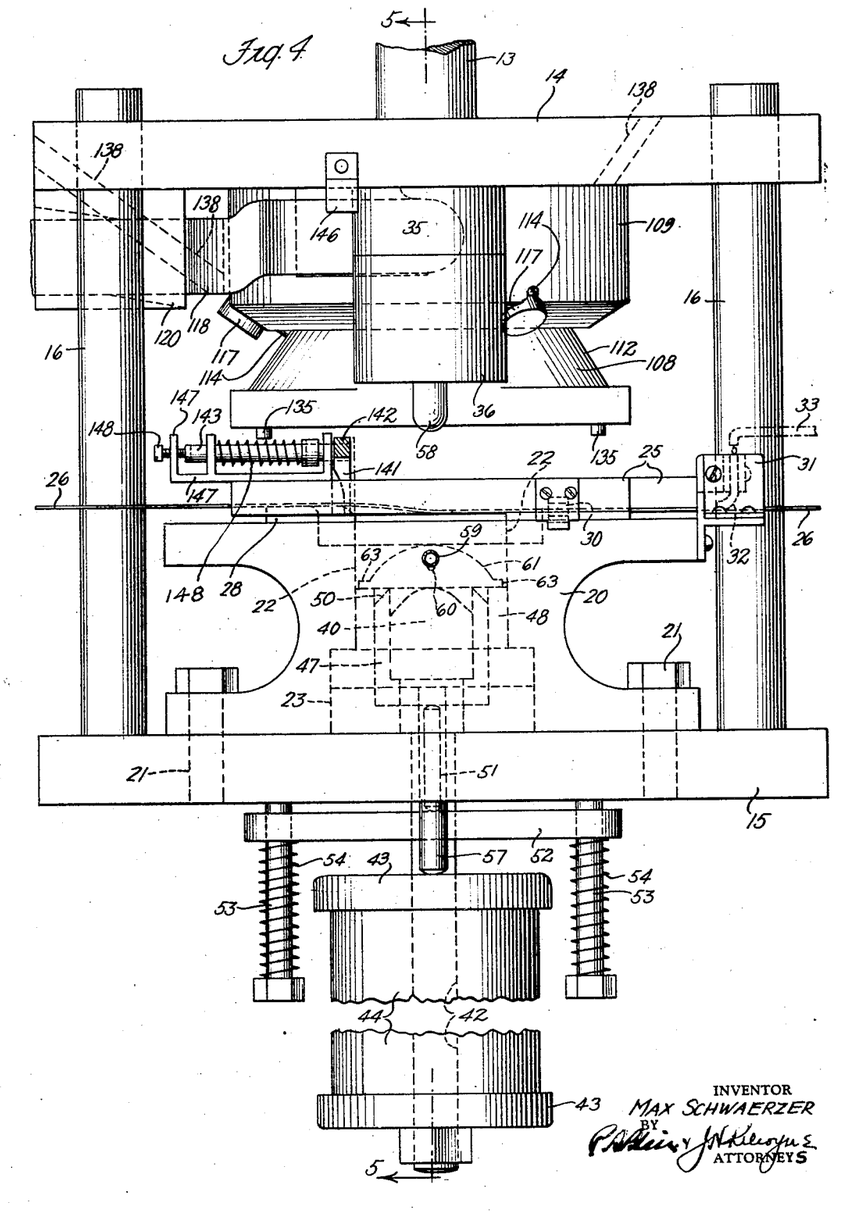
Fig. 4 is a front elevation of the die structure, certain parts being broken away.

The feed of the strip 26 to the dies may be effected manually or automatically, as desired. In order to permit an intermittent feed, as well as a predetermined advance of the strip, while at the same time leaving a web w between the openings t resulting from successive stampings, the following mechanism is provided. A finger 141 (Fig. 5) depends from a lever 142 fulcrumed on rod 143 on the front guide member 25 arranged on block 20 as hereinbefore noted. A spring 144 operative between the free end of the lever and a spring mount 145 maintains finger 141 depressed. When so depressed, the said finger extends thru the opening t just previously formed in strip 25 and is spaced from ring 36 the desired width of web w. The head 14 carries a projecting lug 146 which engages the free end of bar 142 when the head has been carried downwardly on the down stroke of the plunger, and finger 141 is resultingly raised to clear the strip as the latter is fed across the bore 22. Disengagement of lug 146 from the bar 142 causes finger 141 to be again depressed into the hole t to thus limit the feed of the strip. The depth of shims 28 causes the strip to be flexed in advancing thereover and thus permits finger 141 to engage the same. The rod 143, on which lever 142 is fulcrumed, is mounted in a supporting bracket 147 and is engaged by an adjusting screw 148. Adjustment of lever 142 by screw 148 to vary the width of the web is thus possible. Spring 149 on rod 143 serves to urge said rod and finger 141 to the right (Fig. 4) after lug 146 has lifted the finger 141, thus preventing the finger from catching in the same hole and after lug 146 is raised from lever 142.

Figure 22:
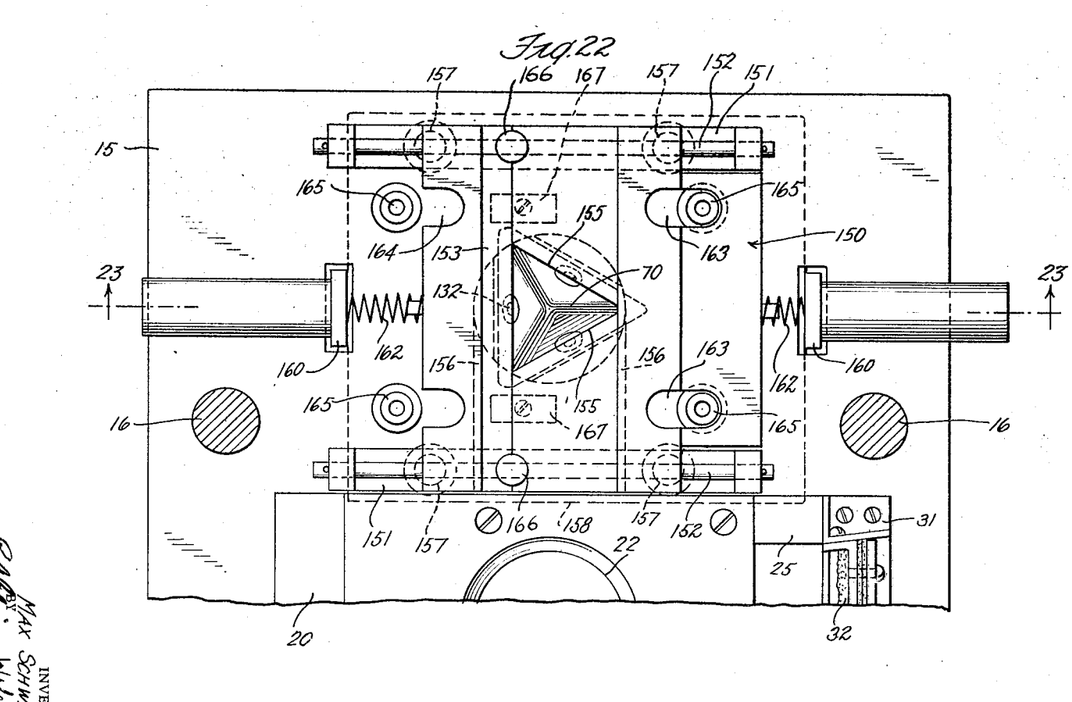
Fig. 22 is a top plan view of a modified type of forming table.
Figure 23:
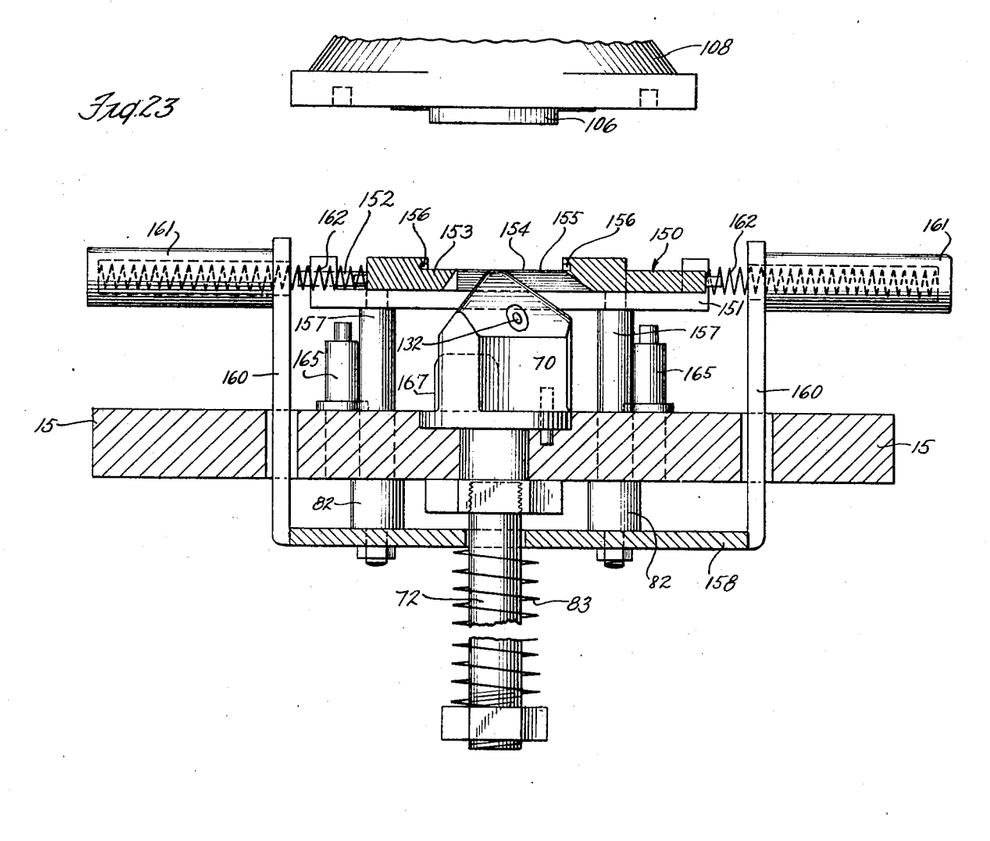
Fig. 23 is a section along line 23—23 of Fig. 22.

Referring to Figs. 22 and 23, there is shown a modified form of table structure comprising a longitudinally extending frame portion 150 from which cross pieces 151 extend transversely, in which cross pieces rods 152 are suitably fixed. Lifting plates 153 and 154, the latter being extended from portion 150, are mounted to slide on said rods. The plate portion 154 is provided with an angular recess 155, while the adjacent edge of plate 153 forms a closing side of said recess which is equilaterally triangular in shape. The plates 153, 154 are provided with grooves 156 similar to grooves 67 of table 65 as hereinbefore described. Supporting rods 157 fixed to cross pieces 151 extend thru the bed plate 15 and have secured at their lower ends a member 158 from which two arms 160 extend upwardly thru suitable openings in the bed plate. Hollow bushings 161 are mounted on arms 160, in which are housed springs 162 operative between said bushings and plates 153 and 150. The springs 162 normally urge the members 150 and 153 into contact with each other. Plate 150 is slotted as at 163 while plate 153 is recessed as at 164 for the reception of limiting lugs 165 fixed on bed plate 15. Upon the down stroke of the press plunger, the female die member 100 depresses the above described table structure and separates over the die member 70 the plates 153, 154, which pick up the formed article from the die member 70 on the up stroke of the press plunger. Lugs 166 (Fig. 22) serve to control the normal or undepressed relation of plates 153, 154. In the depressed relation of the table, said plates engage lugs 167 thereby to prevent the operative faces of the plates from being dulled by engagement with the straight sides of die member 70.

The apparatus above described realizes the objects sought to be attained in that a perfectly formed shield having attachment holes therein is formed at each stroke of the press plunger. The economy of such production is apparent, as the labor and production costs of former methods and apparatus requiring a plurality of successive manipulations and resulting in an inferior product are obviated. By reason of the gradual or incipient drawing of the disk into the upwardly convex shape assumed in the preliminary forming die and the subsequent final forming, the resulting shield is gradually evolved into its final shape and is thus free from wrinkles or pucker along its edges or at its apex. Similarly, excessive straining of the metal structure is prevented by these gradual forming steps. The punching of the attachment holes is effected as the article is supported by the forming step after the articles have been perforated and the resulting distortion of the punched holes is thus eliminated. It will be understood that the principles outlined in the above and the essential features of the invention are applicable for forming and perforating articles other than corner shields for trunks and the like, and all such applications are included within the scope of this invention.

It will be seen that the several objects of the invention are achieved and other advantageous results attained. As many changes could be made in carrying out the above invention, it is intended that all matter contained in the above description or shown in the accompanying drawings shall be interpreted as illustrative and not in a limiting sense.

I claim:

1. In a power press of the character described, the combination of blank stamping mechanism, preliminary forming dies, finishing dies, means to deliver a partially formed article from said first named to said last named dies, and a punch mechanism inclusive of a plurality of punches, the axes of which are inclined to the axis of the finishing dies, said punch mechanism being responsive to the actuation of said finishing dies to closed forming relation to perforate the formed article in said finishing dies.

2. The combination of a power press having a drive shaft and a plunger reciprocated upon actuation thereof, forming dies actuated by said plunger and comprising male and female die members, and punches disposed with their axes inclined to the axis of said die members and operable through one of said die members and actuated upon rotation of said drive shaft to perforate an article maintained between said die members.

3. The combination of a power press having a drive shaft and a plunger reciprocated upon actuation thereof, forming dies actuated by said plunger and comprising male and female die members, a ring slidably mounted on one of said die members, punches mounted in said ring and normally extending in non-perforating relation into said die member, and a connection between said ring and said shaft operative to actuate said ring during closed forming relation of said die members, thereby to actuate said punches into perforating relation therewith.

4. The combination of a power press having a drive shaft and a plunger reciprocated upon actuation thereof, forming dies actuated by said plunger and comprising male and female die members, punches arranged in one of said die members, and cam means on said drive shaft to actuate said punches when said die members are in closed forming relation.

5. The combination of a power press having a drive shaft and a plunger reciprocated upon actuation thereof, forming dies actuated by said plunger and comprising male and female die members, punches arranged in said female die member, and means on said drive shaft operatively connected with said punches to actuate said punches when said die members are in closed forming relation.

6. The combination of a power press having a drive shaft and a plunger reciprocated upon actuation thereof, a male die member fixed on said press, a female die member reciprocable with said plunger, a collar carried by and movable with respect to said female die member, punches mounted from said collar and extending into said die member, and means operative from said drive shaft to actuate said collar when said die members are in closed forming relation whereby said punches perforate an article maintained between said die members.

7. The combination of a power press having a drive shaft and a plunger reciprocated upon actuation thereof, a male die member fixed on said press, a female die member reciprocable with said plunger, a collar carried by and movable with respect to said female die member, punches mounted from said collar and extending into said die member, and cam means on said drive shaft operative to actuate said collar and punches carried thereby when said die members are in closed forming relation.

8. The combination of a power press having a drive shaft and a plunger reciprocated upon actuation thereof, a male die member fixed on said press, a female die member reciprocable with said plunger, a collar carried by and movable with respect to said female die member, punches mounted from said collar and extending into said die member, an arm extending from said collar, and adapted when actuated to render said punches operative, and means to actuate said arm when the die members are in closed forming relation.

9. The combination of a power press having a drive shaft and a plunger reciprocated upon actuation thereof, a male die member fixed on said press, a female die member reciprocable with said plunger, a collar carried by and movable with respect to said female die member, punches mounted from said collar and extending into said die member, an arm extending from said collar, and adapted when actuated to render said punches operative, and cam means on said drive shaft to actuate said arm and punches carried thereby when the die members are in closed forming relation.

Signed at New York, New York, this 6th day of May, 1927.

MAX SCHWAERZER.